United States Patent [19]

Othmer

[11] 3,977,866

[45] Aug. 31, 1976

[54] METHOD FOR PRODUCING TITANIUM

[76] Inventor: Donald F. Othmer, 333 Jay St., Brooklyn, N.Y. 11201

[22] Filed: Dec. 10, 1973

[21] Appl. No.: 423,261

[52] U.S. Cl. .................................. 75/84.5; 75/84.4
[51] Int. Cl.² .......................................... C22B 53/00
[58] Field of Search ........................... 75/84.4, 84.5

[56] References Cited
UNITED STATES PATENTS

| | | | |
|---|---|---|---|
| 2,864,690 | 12/1958 | Lee et al. .............................. | 75/84.4 |
| 3,004,848 | 10/1961 | Hansley et al. ....................... | 75/84.5 |
| 3,043,679 | 7/1962 | Campbell et al. ..................... | 75/84.5 |
| 3,058,820 | 10/1962 | Whitehurst ........................... | 75/84.5 |
| 3,102,807 | 9/1963 | Chisholm .............................. | 75/84.5 |

*Primary Examiner*—Brooks H. Hunt

[57] ABSTRACT

Titanium tetrachloride is reduced at atmospheric pressure and 1245°C to 1750°C by molten manganese to give substantially pure molten titanium metal and gaseous manganese chloride. A counter-current stream of gaseous titanium tetrachloride contacts molten manganese to make the chlorine interchange. Titanium alloys with other metals which will not reduce titanium tetrachloride are made by adding such metals to the reactor with the molten manganese; and they end up as part of the melt with titanium. The manganese chloride formed is oxidized to the oxide while giving chlorine gas, to be used in forming the titanium tetrachloride; and the manganese oxide is carbo-thermally reduced by conventional methods to manganese metal for recycle.

19 Claims, No Drawings

METHOD FOR PRODUCING TITANIUM

Titanium may be produced in a dense liquid melt, as opposed to the usual sponge. Its tetrachloride is reduced by molten manganese metal in a reactor open to atmospheric pressure. This also gives, by a chlorine interchange, manganese dichloride as a vapor. A batch reactor open to the atmosphere or its pressure is charged with molten manganese (M.P. = 1245°C) through which gaseous $TiCl_4$ is bubbled. Titanium has been found to have a lower affinity for chlorine than does manganese; titanium loses its chlorine to, what is in this case, the more active manganese; and titanium metal is formed and heated at least to its melting point of 1668°C and even as high as 1750°C by the heat of the reaction, or added external heat. The manganese chloride is formed directly in the vapor phase since the reactants and the reactor are always well above its boiling point of 1190°C. It passes together with any excess $TiCl_4$ as a vapor stream out of the top of the reactor. The vapors are condensed either totally as the mixture, or partially, with $MnCl_2$ condensing in a first condenser at or below 1190°C, and then $TiCl_4$ in a second condenser at 136°C. The reaction is continued until all of the charge of manganese has interacted with the gaseous $TiCl_4$ to give molten titanium, which is then withdrawn. It may be cast in molds under a vacuum, which vaporizes any residual manganese from the melt, or in an inert atmosphere, e.g., of argon.

Alternatively, this production of dense titanium may be conducted continously in a reactor like a distillation tower open to atmospheric pressure. A liquid stream of molten manganese metal is fed into the top of a tower-like reactor; and it descends down through the tower in dispersed flow, against which rises in countercurrent contact a gaseous stream of titanium tetrachloride. As in the rectifying tower, the rising $TiCl_4$ interchanges with the descending liquid - in this case chemically - to add manganese chloride to the vapor stream which goes off the top as superheated vapor at the temperature of the entering molten manganese, somewhat above its melting point of 1245°C. This is above the boiling point of $MnCl_2$, 1190°C. This superheated vaporous $MnCl_2$ may be condensed separately out of the vapor stream. So that the condensate may be kept liquid, it is not cooled below the melting point of 650°C. Then the $TiCl_4$ is finally condensed. At first, and in the upper part of the reactor, titanium may be formed below its melting point as it goes into solution with the molten manganese, which the $TiCl_4$ contacts. However, the titanium formed becomes a larger and larger part of the descending molten metal stream which is ultimately heated by the heat of the reaction or that of the furnace to the melting point of titanium of 1668°C or even 1700°C or 1750°C. This stream thus may be drawn off continuously at the bottom as liquid titanium with only small amounts of manganese dissolved therein.

While the temperature at the discharge of the titanium may be at just 1668°C, its melting point, a somewhat higher temperature is desirable to supply some sensible heat and thus prevent freezing before the metal can be discharged, also to supply the heat for the vacuum flash evaporationn off of any residual manganese impurity. Furthermore, the flow of titanium seems to be considerably better at a temperature of 1725°C to 1750°C than very near the melting point and incipient freezing.

PRIOR ART PRODUCTION OF TITANIUM

Most titanium metal made to date has been produced from its ores by a four step process: - (a) the chlorination of its oxide in a rutile ore, or in a synthetic rutile ore which has been beneficiated by the removal of iron from an ilmenite ore; (b) the separation and purification of the $TiCl_4$ formed from any other chloride also formed of iron or other metal present in the ore; (c) the reduction of the $TiCl_4$ to titanium metal by the use of an active metal as magnesium, sodium, or calcium, which metal combines with the chlorine of $TiCl_4$ and becomes a metallic chloride; and (d) the electrolysis of this metallic chloride to recover the reducing metal and chlorine, both for recycle.

Processes at atmospheric pressure, such as the Kroll, using magnesium, give a mixture of solid titanium metal and solid magnesium chloride. Separation of this mixture results in what is called titanium sponge, after a rather tedious and expensive processing. Hence, there is a major distinction and substantial difference in the cost of production and the sales value of the sponge product hitherto formed and the dense metal, either liquid or solid, which must be formed either from the sponge, or which would be formed immediately in a reduction process, going directly to the metal, if such were possible.

It is also known to use molten magnesium metal to reduce $TiCl_4$ to titanium at a temperature above the melting point of titanium, 1668°C, i.e., at 1730°C, in a reactor with a closed vapor space and a total pressure developed therein of many atmospheres. The concomittant magnesium chloride is formed as a liquid, is also drawn off as a liquid, and is then electrolyzed to recover the magnesium for reuse as the reducing metal.

RECOVERY AND RECYCLE PROCESS

By contrast to the expensive recovery processes involving electrolysis of the chloride of the reducing metals of the prior art - Mg, Na, or Ca - a more economical recycle operation now has been found for recovering from the metallic chloride formed - here $MnCl_2$ - both the reducing metal - here Mn - and the chlorine. The manganese chloride formed is oxidized to give chlorine for reuse in forming the $TiCl_4$ and at the same time to give manganese oxide, which is then reduced carbothermally to give the reducing metal for reuse.

Manganese is the only metal which has been found which can be so recovered for recycle and which has the capability of reducing titanium as a dense phase from $TiCl_4$ at atmospheric pressure.

It has been well known in the art for many years that manganese chloride may be oxidized readily by oxygen as such or from the air. Chlorine is obtained; and this may be reused in the production of the $TiCl_4$ from the $TiO_2$ in the original rutile or ilmenite ore. The $Mn_2O_3$ formed by the oxidation then may be reduced by carbon using known processing to give manganese metal as the reducing metal for recycle. In fact, the conventional method of manganese metal production is by a carbo-thermal reduction from oxide ores, usually in a blast furnace operation similar to that for iron smelting from its oxide ores. None of the chlorides of the other metals which have been used for reducing titanium from $TiCl_4$, i.e., $NaCl$, $CaCl_2$, or $MgCl_2$, can be oxidized in this way and then carbothermally reduced. All of the metals hitherto used must be regenerated by electrolysis of the chlorides formed in the reduction, a very much more expensive operation.

OBJECTS

The objects and actual accomplishments of this invention includes: -

The production of dense titanium metal by a reduction of $TiCl_4$ in a process open to atmospheric pressure using manganese as a reducing metal to form also manganese dichloride, which chloride may be oxidized to the oxide, and which oxide may, in turn, be reduced carbothermally to give the reducing metal, manganese, for reuse.

The use of manganese in a reactor open to atmospheric pressure to reduce $TiCl_4$ to give liquid titanium metal and gaseous $MnCl_2$ which is separately oxidized to give chlorine gas for reuse, and $Mn_2O_3$, which is carbothermally reduced to give manganese metal for recycle.

The use of a continuous process open to atmospheric pressure of reducing $TiCl_4$ fed as a vapor stream near the bottom of a vertical reactor having a countercurrent and dispersed flow of molten manganese metal downwardly from an upper point, so that there is formed gaseous $MnCl_2$ which goes off as a vapor stream at the top, and molten metal containing titanium which accumulates for withdrawal near the bottom.

The recovery of chlorine gas and the reducing metal as such, from the chloride formed of a metal used to reduce titanium from $TiCl_4$, without the necessity and expense of electrolysis of the salt.

The production of alloys of titanium with metals other than those which reduce $TiCl_4$ to titanium by first melting the metal or metals with manganese, using the manganese in this original melt as the reductant for $TiCl_4$, thus replacing by titanium the manganese in the melt.

PROCESSING EQUIPMENT

The equipment for production of titanium by this invention must withstand relatively high temperatures and the corrosive effect of metals and chlorides at these temperatures. Such equipment may be constructed using many conventional refractory materials. Refractories are used alone or as lining materials for shells made of steel. However, the exterior shell may have to be cooled to maintain it at a suitable temperature below that at which steel fails. The high temperature of molten titanium which is maintained inside the reactor may be next to a layer of permanently frozen titanium metal on the inside of a refractory lining. The outside of the refractory lining, in its turn, may be next to the steel which loses heat to the surroundings, or has additional cooling.

Refractory materials which may be used include oxides of aluminum and silicon and various mixed oxides as spinel.

Some other conventional refractories may also be used with a reasonble life expectancy. Replacement may be required at intervals, without excessive nuisance or expense. This may be regarded as part of the operating costs, particularly in the laboratory examples given.

In batch operations may be used any vessel made of - or lined with - a suitable refractory. It would be fitted with suitable piping to handle the several streams of fluids involved.

In the continuous operation of the process, the gas-liquid contacting reactor may be any one of many suitable devices used in distillation or gas absorption. The limitations are largely those of a suitable design using the necessary refractory materials. Either a packed or bubble plate tower may give the stream of liquid manganese in highly dispersed flow downwardly in the reactor for contact with the gaseous $TiCl_4$ stream rising therein. Thus, the particular design of such a countercurrent contactor-reactor is not a part of this invention.

An important function in this design and operation of this continuous reactor is that of its chlorination of the manganese in such a manner that there will be stripped substantially all of the manganese out of its solution in the titanium at the bottom of the reactor by the incoming stream of substantially pure $TiCl_4$. Even a relatively inefficient contactor will discharge liquid titanium with less than 5% of chemically uncombined manganese; and a good contactor will give liquid titanium with substantially no manganese present. However, in some cases a substantial amount of manganese may be left purposely in the molten metal draw off containing titanium, as will be explained hereafter.

PROCESSING DETAILS

Usually it has been found advantageous to use in the reactor in contacting liquid manganese for its chlorination, a considerable excess of $TiCl_4$ over the stoichiometric requirement. This excess increases the speed of the chemical reaction by mass action, and particularly by sweeping away the $MnCl_2$ formed in a gas stream of excess $TiCl_4$.

The heat cost of the evaporation and condensation of this excess $TiCl_4$ recycle is not important, since the latent heat of evaporation of $TiCl_4$ is low (44 cal/gr).

The reduction of $TiCl_4$ by manganese may be regarded as an irreversible chemical reaction, particularly when provisions are made, as here, for the immediate removal from the scene of the reaction of the $MnCl_2$ formed. Thus there should be required only an efficiency of a single equilibrium unit in the reactor. However, in this reaction of $TiCl_4$ with the molten manganese, the last bit of Mn may be difficult to contact without an excess of $TiCl_4$ and/or an efficient counter current reactor, which might be rated at two or three equilibrium units if used in usual distillation practice.

Another advantage of this excess $TiCl_4$ is that pure $MnCl_2$, which melts at 650°C, may solidify in a condenser, and the excess $TiCl_4$ which condenses with it will keep it dissolved and thus fluid. However, by operating a partial condenser below the condensation point of $MnCl_2$ of 1190°C, but well above its freezing point of 650°C, it may be separated out almost quantitatively. The $TiCl_4$ is then condensed at a lower temperature, 136°C.

This $MnCl_2$ is then oxidized to give chlorine for production of $TiCl_4$, and $Mn_2O_3$ which is reduced to give manganese for reuse. Both steps have been used in other processing for many years. The chlorine and the manganese obtained are recycled with only small losses. The excess $TiCl_4$ recovered as nearly pure liquid is removed in a total condenser immediately following the partial condenser; and may be reused directly.

When it is desired to separate the last of the manganese so that the molten metal stream at the bottom is almost 100% titanium - although it started at the top as 100% manganese - there is a difficulty caused by two relatively unstable compounds of manganese and titanium, $Mn_2Ti$ and $MnTi_2$. Manganese may tend to persist, dissolved in liquid titanium, in these chemically combined forms. However, both lose their manganese by its chlorination by $TiCl_4$ since the intermetallic chemical bonds of these compounds are extremely weak. Nevertheless, there is somewhat greater difficulty in stripping the manganese from the residual affinities for it in these compounds; and the countercurrent action of the contactor-reactor is a big assist, if not a necessity, in removing the last of the manganese to obtain an almost 100% pure titanium for discharge.

As above noted theoretically it is only necessary to obtain an equilibrium, or the chance for reaction by contacting every atom of manganese with $TiCl_4$ and particularly the last of the manganese dissolved in the titanium with $TiCl_4$. Thus, from concepts used in distillation and rectification, it follows that only one "equilibrium unit" or "theoretical plate" should be required in this reactor-contactor to accomplish this irreversible chemical reaction; but in practice an equivalent of several such equilibrium units may well be provided to insure that the liquid, here titanium, is discharged in equilibrium (i.e., here chemical equilibrium) with the gas stream which is almost pure $TiCl_4$. It follows from the relative activities of manganese and of titanium for chlorine that no manganese metal dissolved in the molten titanium can be in equilibrium with $TiCl_4$.

Carrying the analogy with distillation further, such equilibrium of vapor with liquid is not necessary at the top of the column; and a large excess of $TiCl_4$ may be fed in at the bottom and withdrawn at the top without serious additional costs of the operation. Obviously this stream does not leave in equilibrium with the "reflux" or feed stream of the liquid manganese metal.

While the theory of operation to obtain an equilibrium is sound, it is somewhat difficult to strip out all of the Mn from the Ti product; and the last residuum may not always necessarily be removed, or it may be flash evaporated out, or electrolyzed out as hereinafter mentioned.

PRODUCTION OF ALLOYS OF TITANIUM

With a slight variation in the process, titanium-manganese alloys can be made. Thus, it has been found that in either batch or continuous production of titanium, the use of an excess of manganese metal over that which reacts with the $TiCl_4$ gives a corresponding amount of manganese in the final titanium melt, and this manganese-titanium melt can then be removed as an alloy.

Similarly, if another metal which in the molten state will not reduce $TiCl_4$ at atmospheric pressure to give titanium metal is added to the molten manganese used as the reducing metal, this other metal will give an alloy with the titanium. Among those which may be so used are: - zinc, silicon, chromium, lead, cobalt, tin, iron, copper, and nickel. None of these reduce $TiCl_4$ to titanium in the temperature range used, 1245°C to 1750°C.

It has thus been demonstrated that, if a metal which will not reduce $TiCl_4$ is added to the reactor, preferably as a melt and charged with the manganese as a single liquid, there will be no reaction of it in the reactor with the metals or with the $TiCl_4$ present, since the titanium therein has the greater affinity for the chlorine it already holds in the $TiCl_4$.

This added metal in the manganese metal charge goes through the process unchanged, but it is transferred in the same amount to the titanium melt withdrawn and becomes an alloy therewith.

For example, nickel will dissolve in, and alloy readily with, manganese; and a nickel-manganese melt may be prepared of approximately the atomic combining ratio of nickel to manganese as the desired ratio of nickel to titanium in the final alloy. In charging the reactor, batch or continuous, this nickel-manganese melt is used instead of one of pure manganese. The manganese takes the chlorine from $TiCl_4$ in the reduction, as before; and the melt or alloy of nickel-titanium is readily secured as more and more of the titanium replaces the original manganese.

Similarly, lead, chromium, copper, iron, and silicon alloys with titanium may be made; in many cases multiple metal alloys also may be made by preparing the appropriate mix of two or more of these metals in the melt with manganese. With an element having a chloride as low boiling as silicon, there is some danger of the volatility of the chloride removing some of the silicon from the reaction as the chloride, due to the law of mass action; and the fact that complete equilibrium may not be secured at all points in the reactor. This must be allowed for in the production of the alloy, and in the recovery for reuse of the $MnCl_2$ produced and of the excess $TiCl_4$ used. In the case of iron, the ferrous chloride is the stable one at the temperatures involved, and $FeCl_2$ boils at 1030°C. None is formed in making a titanium-iron alloy, because iron added in the melt will not reduce $TiCl_4$.

In general, it has been found that binary and ternary alloys may be made with titanium of those metals which will not reduce $TiCl_4$ and which dissolve in molten manganese. However, alloys cannot necessarily be made by this method throughout the entire range of compositions from zero to 100% titanium, because of the range of melting points and vapor pressure which are encountered for the mixtures or solutions of the metals with titanium and with manganese and for the mixtures of the several metallic chlorides involved.

EXAMPLES

Batch

A tube made of high alumina porcelain 2" in diameter and 12 inches long is closed at the bottom like a test tube, and acts as a vertical reactor. It is fitted with a cover, which has three connections: (a) one to hold a removable ¼ inch diameter tube for gas inlet extending almost to the bottom of the reactor; (b) one for a second ¼ inch diameter tube sealed at its bottom for a thermocouple well which extends to within about 6 inches of the bottom of the reactor; and (c) a ½ inch nozzle 3 inches long for connection to an air-cooled condenser tube, which discharges condensate into a flask, externally cooled when necessary.

The reactor is charged - most conveniently through the nozzle for the condenser connection - with 2000 grams of pure, granular manganese and supported, with cover exposed, in a vertical electric furnace capable of heating the reactor and contents to at least 1700°C. The condenser tube is connected to its nozzle. The gas inlet is connected to a flask charged with $TiCl_4$ which is boiled to supply a vapor stream passing to the bottom of the reactor, then rising in and around the manganese granules. As the furnace is heated to give an ultimate temperature in the reactor of about 1668°C to 1700°C, the flask is boiled very slowly to supply a very small amount of vapors, leaving the flask at the boiling point of $TiCl_4$ (about 136°C) to purge the system of air. The granules of manganese are heated by the furnace, and melt; the gaseous $TiCl_4$ bubbles up through the pure manganese liquid collecting in the reactor bottom; and the rate of boiling in the flask is increased. A total of about 7000 grams (about 4000 cc) of $TiCl_4$ is passed through the reactor as vapors which become greatly superheated as they pass down in the inner tube surrounded by the melted manganese and then rise through the melt itself. This 4000 cc is about twice the stoichiometric amount required for the reaction; and a lesser weight ratio to the titanium to be produced would be used in practice.

The $MnCl_2$ is formed as a gas at the temperature of the reactor, since $MnCl_2$ boils at 1190°C. It is carried away in this superheated vapor stream of $TiCl_4$ and condensed in the air cooled condenser tube, with enough $TiCl_4$ to keep it dissolved and prevent its freezing, if cooled below its melting point of 650°C. Condensate spills from the condenser tube into the vented flask-receiver which has cooling water flowing over its outer surface to condense the last of the $TiCl_4$ at its boiling-condensation point of 136°C. This flask-receiver and contents may later be transferred for use as a distilling flask to distill off the excess $TiCl_4$ from the $MnCl_2$ formed in the reaction.

The reactor collects a residue of about 875 grams of liquid titanium metal containing only a small amount of manganese. If the system is tight, vacuum may be applied as the furnace cools and the titanium solidifies. This evaporation distills off any residual manganese from the product. If this ultimate removal of manganese is not necessary, the inner, gas-feed tube may be withdrawn slightly until it is above the liquid level; a very small amount of $TiCl_4$ is boiled in the flask; and its vapors are kept flowing over the surface of the melt and in the upper part of the reactor to keep out air. Alternatively, argon or other inert gas may be used to prevent contact with air. The titanium may be poured as a liquid into a mold under an inert atmosphere to be cast as solid dense metal. However, after solidification, this laboratory product was obtained by breaking the tube forming the reactor to obtain a bar of nearly pure metal.

High vacuum distills off most of any residual manganese which remains as an impurity, since at the reactor temperature it has a vapor pressure of about 60–80 mm of mercury, while that of titanium is negligibly low. Because of the widely different electrode potentials of the two elements, the small amount of manganese alternatively may be electrolyzed out of the melt in a diaphragm cell.

Continuous

For continuous operation, a 40 inch length of the same, high alumina porcelain tube was used as in the previous example, with a longer tube for feeding gaseous $TiCl_4$. Again this gas feeding tube extended almost to the bottom. The reactor tube was packed from a support at about 10 inches above the bottom to almost the top with Raschig rings made as ¼ sections of the same porcelain tubing. The tubular electric furnace was correspondingly longer. The top of the reactor had an additional tubulature through which could be fed continuously molten manganese metal to the top to flow in a divided spray, or other dispersed flow down through and around the packing shapes. The air-cooled condenser tube and water-cooled receiver flask were the same as before. The thermocouple well was at the same distance above the bottom.

The operation was similar to that of the batch reaction except that the 2000 grams of manganese was melted by a separate furnace at a point above the column. After the system was thoroughly purged of air by passing $TiCl_4$ vapors through it as previously, and the temperature brought up to about 1400°C to 1500°C by the electric furnace, the molten manganese feed was started down through the packing at a temperature conveniently above its melting point of about 1250°C. This temperature could be substantially below the melting point of titanium, 1668°C. The amount of heat supplied to the system by the molten manganese could be controlled by its temperature to control the temperature of the column and thus that of the reaction. The other added heats are the heat of the reaction and that from the electric furnace, which was controlled to give a temperature of 1668°C to 1750°C at the bottom.

The liquid manganese trickled slowly down the column in a dispersed flow which was interrupted and diverted by the packing to maximize the surface for contact with the rising $TiCl_4$ gas. The feed of $TiCl_4$ vapor was increased by increasing the rate of boiling in the flask; and the vapors passed up through the packing to interact chemically with the manganese metal distributed thereon. This gave titanium in the liquid stream, and vaporous $MgCl_2$ in the gas stream. Ultimately, the vapor stream, now a mixture of $TiCl_4$ and $MnCl_4$ passed out of the top of the reactor and was condensed in the air-cooled condenser tube. The condensate was collected as a mixture of the chlorides of the two metals in the chilled receiver flask.

Titanium metal was collected below the packing in the bottom of the reactor tube, which space acted as the product receiver. The temperature there was increased to above that of the melting point of the titanium product which, after passage of the desired amount of $TiCl_4$ from the flask-boiler, was removed at the end of the experiment as before.

Here the chlorine interchange between the two metals took place at a temperature in between their two melting points in the films of menganese in dispersed flow on the packing shapes to give gaseous $MnCl_2$ to add to the gas stream rising in the tower. Titanium metal was formed in the reaction and was added to the liquid metal stream descending against the rising gas stream. The $TiCl_4$ entered the reaction zone at the very bottom of the reactor, having come down through the inner tube for gas feed, as in the batch reactor. Any metallic manganese which might not have been reacted with $TiCl_4$ in its dispersed flow descent through and around the packing shapes, would reach the bottom reservoir with the titanium metal formed in the reaction. It would have another chance to be reacted and stripped from the product titanium by the pure $TiCl_4$ vapors entering and bubbling up through this product hold-up.

Again an excess of $TiCl_4$ - about 4000 cc total liquid volume - was boiled away from the flask and passed down the inner vertical feed tube to the bottom of the reactor, to rise up, around, and through the Raschig rings on which the 2000 grams of melted manganese metal flowed downwardly from the top during the course of the experiment, much the same as a reflux wash in a distilling tower. This excess TiCl$_4$ passed out the top of the column carrying the MnCl$_2$ in a stoichiometrically equivalent amount to that of the titanium formed. This gas stream was condensed in the condenser and collected in the receiving flask. The TiCl$_4$ was again recovered for the next cycle by distilling it away from the MnCl$_2$.

In the operation of the continuous tower reactor, the MnCl$_2$ is formed in the vapor phase to pass in the vapor stream overhead; and at least much of it is formed in the tower itself and at a temperature below the melting point of titanium metal and above that of manganese. However, it is desired to keep the temperature of the titanium in the product reservoir high enough so that any manganese metal which does reach there will react with the feed stream of TiCl$_4$ and be driven out as a vapor stream. It should be noted that the product reservoir temperature is that of the melting point of the molten metal mixture therein - or slightly higher - and not that of the boiling point of the liquid, as in a usual distilling system. Also, the gas phase is a very highly superheated, nearly pure, vapor, TiCl$_4$, at the bottom; and it takes on more and more of another superheated vapor, MnCl$_2$, as it rises, while the vapor stream in a distilling tower of changing composition is always desirably near the saturation point in equilibrium with the liquid which it is contacting.

Moreover, in operating this continuous system, the provision would always be made to withdraw continuously the liquid titanium at the base, while the complication of a draw-value for liquid titanium was eliminated in the present example. This product is substantially free of chemically uncombined manganese. It may be withdrawn for casting under vacuum to flash evaporate or distill off any traces of manganese; or under an atmosphere of inert gases, such as argon.

I claim:

1. A process for producing titanium metal in a dense liquid form, comprising the following steps:
    a. charging a liquid initially comprising molten manganese into a chemical reactor open to atmospheric pressure;
    b. contacting in said reactor said liquid initially comprising molten manganese with a gas stream initially comprising titanium tetrachloride;
    c. reacting chemically in said reactor at least a part of said titanium tetrachloride with at least a part of said molten manganese at a temperature between 1245°C and 1750°C, thereby producing titanium metal in said liquid, and gaseous manganese dichloride in said gas stream;
    d. separating from said liquid said gas stream now containing said manganese dichloride; and
    e. removing said liquid containing said titanium substantially free of said manganese dichloride.

2. A process according to claim 1 wherein said contacting of said liquid with said gas stream is accomplished by bubbling said gas stream containing said titanium chloride through a liquid melt initially comprising manganese metal.

3. A process according to claim 1 wherein: said liquid initially comprising said molten manganese metal passes in dispersed flow through said reactor countercurrently to said gas stream initially comprising titanium tetrachloride, thereby giving contact of said liquid with said gas stream.

4. A process according to claim 3 wherein: at least some part of said titanium metal formed by said chemical reaction goes into solution with said molten manganese in said flow of liquid.

5. A process according to claim 4 wherein: said liquid becomes a solution of said titanium in said manganese and becomes progressively more concentrated in said titanium, the nearer said flow of liquid approaches the inlet of said gas stream, and as said manganese is converted to manganese dichloride vapor.

6. A process according to claim 5 wherein: said manganese in said liquid is converted substantially entirely to manganese dichloride; and said liquid becomes substantially pure titanium.

7. A process according to claim 1 wherein: said gas stream containing manganese dichloride is carried out of said reactor with an unreacted part of said titanium tetrachloride at substantially atmospheric pressure.

8. A process according to claim 7 wherein: said gas stream leaving said reactor and containing said manganese chloride is passed to at least one cooling zone, and at least most of said gas stream is condensed.

9. A process according to claim 8 wherein said condensation is accomplished in two steps:
    a. a preliminary condensation of said manganese dichloride from said gas stream with the cooling and separation of the liquid condensate containing manganese dichloride and substantially no titanium tetrachloride at a temperature not lower than the melting point of manganese dichloride of about 650°C;
    b. a final condensation of said titanium tetrachloride to give a liquid condensate containing substantially no manganese dichloride.

10. A process according to claim 3 wherein said gas stream entering said reactor contains substantially pure titanium tetrachloride and acquires manganese dichloride vapor in its passage through said reactor, to leave said reactor containing the highest concentration of manganese dichloride of any point in said reactor.

11. A process according to claim 3 wherein said liquid in dispersed flow containing substantially pure metallic manganese where said liquid enters at one end of said reactor and acquires titanium metal in its passage through said reactor, so as to leave at a second end of said reactor with the highest concentration of titanium metal of any point in the reactor.

12. A process according to claim 11 wherein said liquid in dispersed flow is discharged at said second end of said reactor containing said titanium with less than 5% chemically uncombined manganese.

13. A process according to claim 12 wherein said liquid containing said titanium with less than 5% chemically uncombined manganese is subjected to a reduced pressure whereby at least some of said manganese is distilled away from said titanium.

14. A process according to claim 11 wherein said liquid in dispersed flow is discharged at said second end of said reactor containing said titanium with substantially no manganese.

15. A process according to claim 12 wherein said discharging liquid containing said titanium is withdrawn from said reactor and passed to a casting mold while under a reduced pressure whereby at least some of any residual manganese and manganese compounds which are present flash evaporate from said discharging stream of liquid containing titanium.

16. A process according to claim 12 wherein said discharging stream of liquid containing said titanium is withdrawn from said reactor and passed to a casting mold under an atmosphere of an inert gas.

17. A process according to claim 1 wherein:
   a. manganese dichloride is separated from said separated gas stream;
   b. said separated manganese dichloride is reacted with oxygen to given chlorine and a manganese oxide;
   c. said manganese oxide is reduced by carbon to give manganese metal; and
   d. said manganese metal is recycled to said process for producing dense liquid titanium.

18. A process according to claim 1 wherein:
   a. said titanium produced in a dense liquid form is in an alloy with another metal which will not reduce said titanium tetrachloride to give titanium metal under the conditions in said chemical reactor;
   b. said liquid charged to said reactor and initially comprising molten manganese has dissolved therein said other metal in the same amount as appears in said alloy with said titanium produced.

19. A process according to claim 1 wherein:
   a. said titanium produced in a dense liquid form is in an alloy with at least two other metals, none of which will reduce titanium chloride to give titanium metal under the conditions in said chemical reactor;
   b. said liquid charged to said reactor and initially comprising molten manganese has dissolved therein said other metals and in the same respective amounts as appear in said alloy with said titanium produced.

* * * * *